April 2, 1963
E. B. CLARK
3,083,735
DUCT END MARKER
Filed June 6, 1960
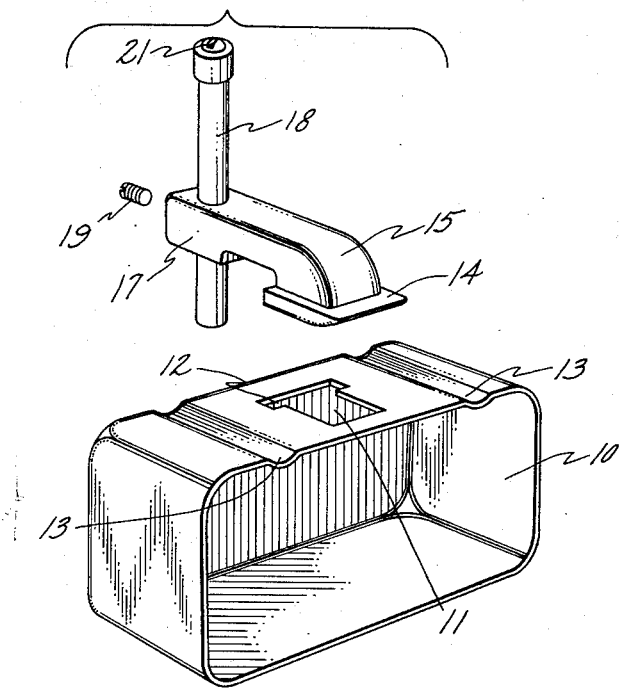
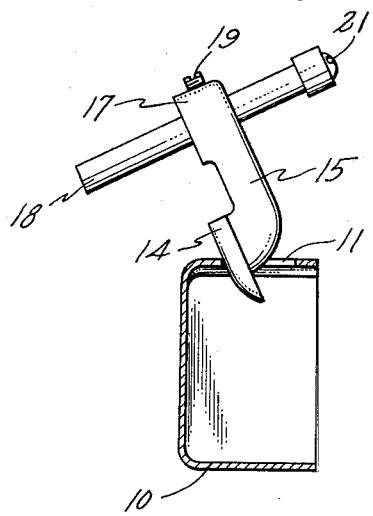
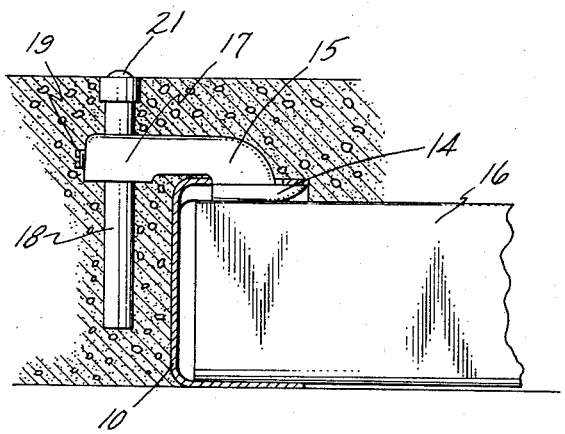
Inventor:
Edward B. Clark
by Allard A. Braddock
His Attorney

United States Patent Office 3,083,735
Patented Apr. 2, 1963

3,083,735
DUCT END MARKER
Edward B. Clark, Milford, Conn., assignor to General Electric Company, a corporation of New York
Filed June 6, 1960, Ser. No. 34,144
4 Claims. (Cl. 138—89)

This invention relates to a duct end marker which is used to locate the end of a section of duct or conduit installed underneath a floor.

In industrial and commercial buildings being constructed today, it is customary to include underfloor duct through which wires to provide electric light and power and telephone service are run. These ducts are normally composed of metal of rectangular cross-sectional configuration. Frequently, the ducts are encased in concrete and thereafter their exact location cannot be readily determined. When alterations are made later, a great deal of concrete is spared if the locations of the ducts are known.

One object of the present invention is to provide an unobtrusive means for indicating the location of an underfloor duct end.

Another object of the present invention is to provide a surface level marker showing the position of the end of an underfloor duct.

The above and other objects are accomplished as illustrated on the accompanying drawing in which—

FIG. 1 is a perspective view of the separate elements comprising the invention;

FIG. 2 is a sectional view illustrating the means whereby the marker holder or boss is positioned within an end cap; and FIG. 3 is a view partially in section showing the duct end marker of this invention in its installed position.

Briefly stated, in accordance with one of its aspects, the present invention is directed to an end marker for underfloor duct comprising an end cap having side portions, the cap on one side portion defining an aperture of generally rectangular configuration with an enlarged end, a plate adapted for entry through the enlarged end of the aperture, the plate being larger than the remaining portion of the aperture, a boss integral with the plate and having a portion extending outward in a direction parallel to the plane of the plate, the extending portion of the boss defining an aperture axially perpendicular to the plane of the plate, and a marker post positioned in the boss aperture, the marker post beng axially movable in the boss aperture.

As best shown in FIG. 1, an end cap 10 constructed in accordance with this invention is provided on one side with an aperture 11 of generally rectangular configuration, the aperture 11 having an enlarged section 12 of rectangular configuration at one end thereof. The end cap 10 also has a groove 13 on each side of the aperture 11 extending from the open edge of the end cap to the base thereof.

A plate 14 integral with a boss or marker post holder 15 of a width slightly less than the enlarged portion 12 of the aperture 11 is arranged to slide through the enlarged portion of the aperture, as illustrated in FIG. 2. When the plate 14 is within the end cap 10, the boss 15 is rotated to bring the top surface of the plate 14 flush with the interior surface of the end cap 10. In this position, the plate 14 cannot be withdrawn from the end cap 10 since the aperture 11 has less area than the plate 14. When the assembly is now slipped over the end of an underfloor duct 16 (FIG. 3), the open side of the plate 14 abuts the surface of the duct 16 and the boss 15 cannot thereafter be rotated and the plate 14 withdrawn through the enlarged end of the aperture.

The boss or marker post holder 15 extends away from the plate in a direction parallel to the plane of the plate and has an end 17 which protrudes beyond the end cap 10. The end 17 is equipped with an aperture having an axis perpendicular to the plane of the plate in which the marker post 18 is positioned. As shown in FIG. 3, the effect of this arrangement of parts is to position the maker post 18 vertically once the end cap 10 is in place on a section of underfloor duct 16. The marker post 18 may be set for any position with respect to the boss 15 and held in this position by means of a set screw 19. Thus, if concrete is to be set to a depth of 1½ inches above the underfloor duct 16, the marker post 18 is set to extend upward this distance with just a rounded end 21 extending above floor level. Thereafter, if it is at any time in the future desired to locate the end of a section of underfloor duct, the rounded protruding end 21 of the marker post 18 provides this information.

The grooves 13 of the end cap 10 enable the end caps to be used either with or without the marker assembly. End caps must be made with a width greater than otherwise necessary in order to accommodate the thickness of the plate 14, as is apparent from FIG. 3. If only the end cap 10 is used on the end of a section of duct 16, the grooves 13, which are ridges with respect to the interior of the end cap 10, make contact with the duct 16 to provide frictional engagement with the duct which maintains the end cap 10 in position thereon. When end cap markers are used, frictional engagement to retain the end cap 10 in place is provided by the plate 14.

While the present invention has been described with reference to a particular embodiment, it is obvious that there may be variations which still fall within the true spirit of the invention. Therefore, the invention should be limited only as may be necessitated by the scope of the appended claims.

What I claim as new and desire to secure by Letters Patent of the United States is:

1. An end marker for underfloor duct comprising an end cap having side portions, said cap on one side portion defining an aperture of generally rectangular configuration with an enlarged end, a plate adapted for entry through the enlarged end of said aperture, said plate being larger than the remaining portion of said aperture, a boss integral with said plate and having a portion extending outward in a direction parallel to the plane of said plate, the extending portion of said boss defining an aperture axially perpendicular to the plane of said plate, and a marker post positioned in said boss aperture, said marker post being axially movable in said boss aperture.

2. An end marker for rectangular underfloor duct comprising an end cap having four sides which fit around a duct end, one of said sides defining a generally rectangular aperture having a rectangular enlargement at one end, a boss terminating in a plate at one end, said plate passing through the enlarged end of said end cap aperture and being anchored within said cap by the portion of said cap defining the remainder of said aperture, the end of said boss opposite said plate extending beyond the end of said cap and defining an aperture, and a marker post positioned in said boss aperture and axially movable therein.

3. An end marker for underfloor duct as claimed in claim 2 wherein the marker post is positioned in the boss aperture by means of a set screw.

4. An end marker cap for underfloor duct as claimed in claim 2 wherein the side of the end cap containing the aperture has a groove on each side of the aperture leading from the edge to the base of the cap.

References Cited in the file of this patent

UNITED STATES PATENTS

| | | |
|---|---|---|
| 966,086 | Faile | Aug. 2, 1910 |
| 1,360,359 | Beaudet | Nov. 30, 1920 |
| 1,782,779 | Fullman | Nov. 25, 1930 |